United States Patent [19]

Ho et al.

[11] Patent Number: 5,164,463

[45] Date of Patent: Nov. 17, 1992

[54] BISMALEIMIDE COMPOSITIONS WITH EPOXIDE-AROMATIC AMINE FORTIFIERS

[76] Inventors: Kam W. Ho, 62 Signature Close S.W., Calgary, Alberta, Canada, T3H 2V7; Adrian Cassola, 230 Twin Lakes Drive, Clearwater, Ontario, Canada, N7S 5G1

[21] Appl. No.: 603,282

[22] Filed: Oct. 25, 1990

Related U.S. Application Data

[63] Continuation-in-part of Ser. No. 430,864, Oct. 23, 1989, abandoned.

[51] Int. Cl.$^5$ ............ C08L 63/02; C08L 79/08; C08G 73/10
[52] U.S. Cl. ................ 525/530; 525/422; 528/322
[58] Field of Search ............ 525/422, 423, 530; 528/322

[56] References Cited

U.S. PATENT DOCUMENTS

| | | | |
|---|---|---|---|
| 3,978,152 | 8/1976 | Gruffaz et al. | 525/530 |
| 4,128,598 | 12/1978 | Makino et al. | 525/530 |
| 4,288,359 | 9/1981 | Graham | 525/530 |
| 4,480,082 | 10/1984 | McLean et al. | 528/103 |
| 4,739,028 | 4/1988 | McLean et al. | 528/103 |
| 4,816,533 | 3/1989 | McLean et al. | 525/526 |

FOREIGN PATENT DOCUMENTS

| | | | |
|---|---|---|---|
| 58-142912 | 8/1983 | Japan | 525/530 |
| 58-142913 | 8/1983 | Japan | 525/530 |
| 61-72025 | 4/1986 | Japan | 525/422 |
| 64-4682 | 1/1989 | Japan | 525/423 |

*Primary Examiner*—Robert E. Sellers
*Attorney, Agent, or Firm*—Stevens, Davis, Miller & Mosher

[57] ABSTRACT

This invention relates to thermosettable bismaleimide resin compositions, and to cured bismaleimide thermoset resins.

The compositions of the present invention contain an additive which is the reaction product of (i) an epoxide, and (ii) a second reactant selected from an aromatic polyhydroxyl, an aromatic amide or an aromatic amine. The thermoset resins having surprising strength and modulus properties, and are suitable for use in the preparation of composite materials.

2 Claims, No Drawings

BISMALEIMIDE COMPOSITIONS WITH EPOXIDE-AROMATIC AMINE FORTIFIERS

This application is a continuation-in-part of application Ser. No. 07/430,864 filed Oct. 23, 1989, now abandoned.

FIELD OF THE INVENTION

This invention generally relates to bismaleimide reins which have improved strength and modulus properties. The compositions of the present invention contain an additive which is the reaction product of a defined epoxide with a second reactant selected from a defined aromatic polyhydroxyl, aromatic amide or aromatic amine.

BACKGROUND OF THE INVENTION

Many prior attempts have been made to improve the properties of bismaleimide ("BMI") resins.

U.S. Pat. No. 4,218,598 and the abstract of Japanese Kokai 61/72025 (both assigned to Toshiba) teach the preparation of a BMI/aminophenol adduct, followed by a curing reaction in the presence of a diepoxide.

The abstract of Japanese Kokai 58/142912 (assigned to Toshiba) illustrates BMI compositions which contain a diepoxide and an aminosulfanilamide.

The abstract of Japanese Kokai 58/142913 (to Toshiba) teaches a composition which comprises BMI, a diepoxide and o-aminobenzamide.

U.S. Pat. No. 4,288,359 (to DuPont) describes the preparation of a BMI/diepoxide adduct, followed by a curing reaction in the presence of an aromatic amine.

Prior art relating to epoxy resin modification is also of general background relevance to the present invention. In particular, the use of "fortifiers" as additives to improve the properties of epoxy resins is disclosed in U.S. Pat. Nos. 4,739,028, 4,480,082 and 4,816,533, the disclosures of which are incorporated herein by reference. The term "fortifier" refers to an adduct of a selected epoxide and a second reactant which is chosen from specific amine, amide or polyhydroxyl compounds. In general, these fortifiers are low molecular weight materials with low melting points.

Fortifiers improve the strength properties of thermoset epoxy resins, without causing the thermoset to become brittle.

Heretofore, the reported use of the above fortifiers has been essentially restricted to epoxy resins. It has now been surprisingly discovered that selected "epoxy fortifiers" may be utilized to prepare thermoset bismaleimide resins having improved properties.

SUMMARY OF THE INVENTION

The present invention provides a thermosettable bismaleimide composition comprising (i) a thermosettable bismaleimide resin and (ii) a fortifier comprising the reaction product of (a) an epoxide selected from a monoepoxide and a diepoxide, and (b) a second reactant, where the second reactant is selected from a defined aromatic amine, a defined aromatic amide, and a defined polyhydroxyl compound.

The invention also provides a thermoset bismaleimide resin which is prepared by curing the inventive bismaleimide composition.

DETAILED DESCRIPTION

The thermoset resins of the present invention have improved strength and ductility. The precise mechanism by which the present fortifiers improve the properties of bismaleimide resins is not known. However, it is known that cured BMI resins may contain small voids which constitute imperfections in the thermoset matrix. It is believed that the present fortifiers fill voids in the cured resin and thereby may reduce the formation of cracks and/or the rate of crack propagation.

Thermosettable bismaleimides, which are also referred to as crosslinkable bismaleimides, are resins derived from an addition reaction between unsaturated imide monomers or oligomers. As used herein, the term "thermosettable bismaleimide resin" refers to bismaleimide resins, per se, and to resins which provide bismaleimide type structural units upon curing.

Many thermosetting bismaleimides are well known articles of commerce. A detailed discussion of crosslinkable bismaleimides is given in section 2 of Engineered Materials Handbook, Volume 1 Composites (edited by Dostal et al; published by ASM International of Metals Park, Ohio, 1987), the disclosure of which is incorporated herein by reference.

The preferred bismaleimides for use in the present invention contain repeating structural units derived from 4,4'-Bismaleimidodiphenylmethane (BBMI 4,4' MDA")

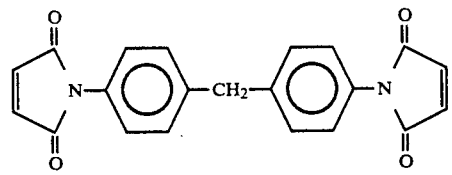

and/or oligomers thereof. Other suitable thermosettable bismaleimide resins include those of the following formulae:

(1)

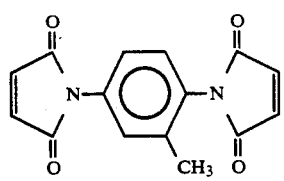

(2)

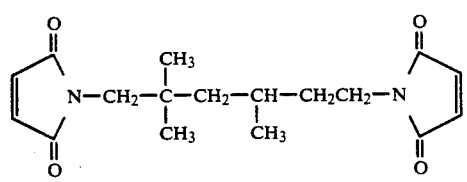

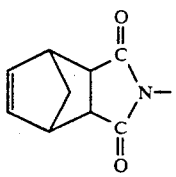

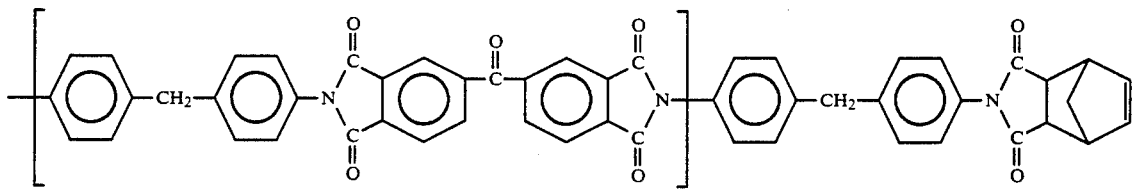

(3)

As described in the aforesaid Scola reference, commercially available thermosettable bismaleimide resins are sold in four main forms, namely bismaleimide homopolymer resins, bismaleimide amine oligomer-containing resins, bismaleimide-olefin resins and resins containing bismaleimide and 0,0'-dicyanobisphenol A (also referred to as "BT" bismaleimides). Any of the commercially available thermosetting bismaleimide resins may be employed in the present invention.

The fortifier of the present invention is the reaction product of a selected epoxy and a selected second reactant.

The epoxy which is used to prepare the present fortifier is selected from a monoepoxide and a diepoxide.

The monoepoxide is defined by the formula:

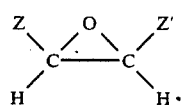

wherein Z and Z' are independently selected from hydrogen, halogen, $C_{1-4}$ alkyl, halogenated $C_{1-4}$ alkyl, phenyl, halogenated phenyl and an alkylene-linked aromatic ether. Suitable monoepoxides include ethylene oxide, styrene oxide, propylene oxide, epichlorohydrin and phenylglycidyl ether (PGE).

The diepoxide contains two epoxide rings. It is preferred to employ an "unsymmetrical diepoxide" (i.e. a diepoxide in which one of the epoxide rings is less reactive than the other, as may be obtained through appropriate substitution). Suitable diepoxides include vinyl cyclohexene dioxide, 3,4-epoxy cyclohexyl methyl-3',4',-epoxy cyclohexyl carboxylate, bis(2,3-epoxycyclopentyl) ether and p-epoxycyclopentylphenyl glycidyl ether.

The "second reactant" used to prepare suitable fortifiers is selected from a defined aromatic amine, aromatic amide and aromatic polyhydroxyl.

The aromatic amine "second reactant" is defined by the formula:

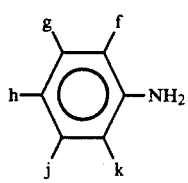

wherein f, g, h, j and k are independently selected from hydrogen, $C_{1-4}$ alkyl, halogen, halogenated $C_{1-4}$ alkyl, phenyl, halogenated phenyl, hydroxyl, amino, carboxylic acid, an alkylene-linked aromatic amine moeity, an alkylene-linked aromatic amide moeity

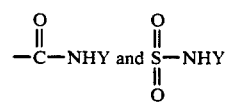

wherein Y is selected from H, $C_{1-4}$ alkyl, phenyl and carboxylic acid. As used herein, the term "alkylene-linked" refers to an alkylene linkage having less than 5 carbon atoms. Suitable examples of this aromatic amine include aniline, methylenedianiline, m-phenylenediamine, 4-chloroaniline, 4 bromoaniline, 2,4,6-tribromoaniline, 2,4,6-trichloroaniline, ortho-toluidene, meta or para-aminophenol, sulfanilamide and para-aminobenzoic acid.

The aromatic amide "second reactant" is defined by the formula:

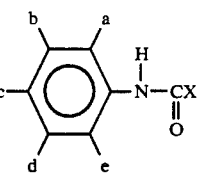

wherein said a, b, c, d and e are independently selected from hydrogen, $C_{1-4}$ alkyl, halogen, halogenated $C_{1-4}$ alkyl, amino and an alkylene-linked aromatic amide moeity and wherein X is selected from hydrogen, $C_{1-4}$ alkyl, phenyl and

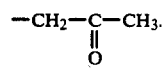

Suitable examples of this aromatic amide include acetanilide, acetoacetanilide, 4-hydroxyacetanilide, 2-hydroxyacetanilide, 4-amino-acetanilide, 4-chloroacetanilide, 4-bromoacetanilide, di(4-formamidodiphenyl) methane, 2'4'-dichloroacetanilide. The aromatic polyhydroxyl "second reactant" is defined by the formula:

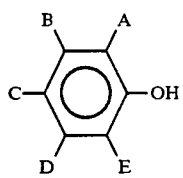

wherein A, B, C, D and E are independently selected from hydrogen, $C_{1-4}$ alkyl, halogen, halogenated $C_{1-4}$ alkyl and hydroxyl, with the proviso that at least one of A, B, C, D and E is hydroxyl. Examples of suitable polyhydroxyls include resorcinol, 1,2,3-trihydroxybenzene, 1,3,5-trihydroxybenzene, 1,2-dihydroxybenzene and hydroquinone.

A preferred fortifier for use in the present invention may be conveniently prepared from 3,4-epoxy cyclohexyl methyl-3,'4'-epoxy cyclohexyl carboxylate and aniline.

The fortifier is prepared by reacting the aforedefined epoxy and the aforedefined second reactant at an elevated temperature, preferably from 70° C. to 230° C. (especially from 120° C. to 180° C.) for from 15 minutes to 24 hours.

The reaction is exothermic, so cooling of the reaction vessel may be required. As will be readily appreciated by those skilled in the art of chemical synthesis involving exothermic reactions, it is preferred to allow the reaction temperature to increase as the reaction progresses (in order to facilitate the reaction, while still maintaining the capability to control the reaction in a manner which prevents an undesired sudden increase in temperature). The preferred molar ratio of epoxy to second reactant is from 1:1 to 10:1, especially from 1.1:1 to 5:1.

The reaction to prepare the fortifier may be assisted by a catalyst such as diethylamine hydrochloride, ethylmethylimidazole, alpha-methylbenzyldimethylamine, 2-hydroxybenzyldimethylamine or hindered phenols such as 2,6-di-tertiary-butyl-alpha-dimethylamine-para cresol. When employed, a preferred catalyst concentration is from 0.01 to 0.4 weight percent.

Thermoset bismaleimide resin compositions having improved shear strength are obtained by incorporating an effective quantity of the above described fortifiers. The preferred quantity of fortifier is from 5 to 30 parts by weight, based on 100 parts by weight of bismaleimide.

The thermoset compositions of the present invention may be prepared by curing the above described thermosettable compositions using techniques which are conventionally employed for the curing of bismaleimide resins. It is preferable to cure the present compositions by heating them at temperatures between 170° and 250° C. for times between 2 and 14 hours.

The present compositions may further contain additives, fillers and reinforcing agents which are typically used with bismaleimide resins (such as fibres, filaments, yarns, fabrics, silicon dioxide, mica and silicon carbides).

Further details are provided by the following examples, in which all parts are by weight unless otherwise indicated.

EXAMPLE 1

This example illustrates the preparation of a fortifier from a monoepoxide and an aromatic amide, and the subsequent use of the fortifier to prepare a thermoset bismaleimide resin having surprising shear strength properties.

The fortifier of this example was prepared by adding 42.0 parts by phenyl glycidyl ether ("PGE"), 35.4 parts of acetoacetanilide ("AAA"), and 0.19 parts of 2-ethyl-4-methylimidazole (as catalyst) to a stirred reactor, gradually heating to 100° C., then allowing the temperature to rise from 100° C. to 160° C. over an 8 hour period.

The resulting fortifier was allowed to gradually cool and was then recovered from the reactor.

Thermosettable bismaleimide resin compositions were then prepared as described below.

The comparative thermoset bismaleimide resin was prepared from a thermosettable composition consisting of a mixture of 60 grams of proprietary bismaleimide produced by Technochemie GMBH Verfahrenstechnik (a Deutsche Shell subsidiary) and sold under the tradename COMPIMIDE 796 by Shell Chemical Company (believed to be a maleimide resin containing BMI 4,4'MDA) and 27 grams of COMPIMIDE TM-121, also a proprietary compound produced by Technochemie GMBH Verfahrenstechnik (reported to be a bisallylphenyl ether).

The comparative thermosettable composition was cured according to the conventional curing cycle described below:

1. The composition was heated to 100° C. to 130° C., then degassed under vacuum for 5 to 8 minutes.
2. The composition was then poured into a hot, flat plate mold.
3. The composition was then cured at 190° C. for 2 hours, followed by 5 hours at 210° C., followed by hours at 250° C.
4. The resulting thermoset bismaleimide resin was tested for tensile modulus (ASTM D638-86) and shear strength (ASTM D732-85).

The comparative thermoset resin was found to have a tensile modulus of 534.8K psi (i.e. 534,800 psi) and a shear strength of 10939.2 psi.

An inventive thermosettable resin composition was then prepared from 60 grams of COMPIMIDE 796, 27 grams of COMPIMIDE TM-121 and 13 grams of the above described PGE/AAA fortifier. The inventive composition was cured using the above described conventional curing cycle. The inventive thermoset resin was found to have a tensile modulus of 630.2K psi (18 percent higher than that of the comparative resin) and a shear strength of 13423.0 psi (23 percent higher than that of the comparative resin).

A second inventive composition was prepared from 60 grams of COMPIMIDE 796, 27 grams of COMPIMIDE TM-121 and 21.8 grams of the above described PGE/AAA fortifier. This composition was also cured using the above described conventional curing cycle. ASTM testing on the resulting inventive resin showed it to have a tensile modulus of 634.3K psi (19 percent greater than the comparative resin) and a shear strength of 12429.6 psi (14 percent greater than the comparative resin).

EXAMPLE 2

This example illustrates the preparation of a fortifier from a diepoxide and an aromatic amine, and the subsequent use of the fortifier to prepare a thermosettable bismaleimide resin composition.

The fortifier of this example was prepared by adding 1.5 gram moles of 3,4-epoxy cyclohexyl methyl-3',4'-epoxy cyclohexyl carboxylate ("ECM") and 1 gram mole of aniline ("AN") to a stirred reactor, gently heating to 160° C., then allowing the temperature to rise to 180° C. over an 8 hour period.

The resulting ECM/AN fortifier was allowed to gradually cool and was then recovered from the reactor.

An inventive thermosettable resin composition was then prepared form 60 grams of COMPIMIDE 796, 27 grams of COMPIMIDE TM-121 and 21.8 grams of the above described ECM/AN fortifier. The inventive composition was cured using the conventional curing cycle described in Example 1.

The inventive thermoset resin was found to have a tensile modulus of 610.9K psi (14 percent higher than that of the comparative resin) and a shear strength of 13429.0 psi (23 percent higher than that of the comparative resin).

EXAMPLE 3

This example illustrates the preparation of a fortifier from a diepoxide and an aromatic amine, and the use of the fortifier to prepare a bismaleimide resin having improved properties.

The fortifier of this example was prepared by adding 66.5 parts of ECM and 11.35 parts of sulfanilamide ("SAA") to a stirred reactor, gradually heating to 150° C. and maintaining the temperature at 150° C. for 1 hour.

The resulting fortifier was allowed to gradually cool and was then recovered from the reactor.

An inventive thermosettable resin composition was then prepared from 60 grams of COMPIMIDE 796, 17 grams of COMPIMIDE TM-121 and 13 grams of the above described ECM/SAA fortifier. The inventive composition was cured using the conventional curing cycle described in Example 1.

The inventive thermoset resin was found to have a tensile modulus of 570.6K psi (7 percent higher than that of the comparative resin) and a shear strength of 13177.0 psi (20 percent higher than that of the comparative resin).

A second inventive composition was prepared from 60 grams of COMPIMIDE 796, 27 grams of COMPIMIDE TM-121 and 21.8 grams of the above described ECM/SAA fortifier. This composition was also cured using the conventional curing cycle of Example 1. ASTM testing on the resulting inventive resin showed it to have a tensile modulus of 600.7K psi (12 percent greater than the comparative resin) and a shear strength of 13007.2 psi (19 percent greater than the comparative resin).

EXAMPLE 5

Examples 5 through 10 were completed at a different laboratory, by a different technician and using a different batch of BMI resin (in comparison to Examples 1 to 4).

The following procedures were employed for the preparation of the compositions of Examples 5 to 10.
1. The ingredients were melt mixed at 120° to 130° C.
2. The compositions were then degassed under vacuum for 10 to 15 minutes.
3. The compositions were then reheated to 125° to 130° C. and stirred.
4. The compositions were poured into a flat plate mold (which had been pre-treated with a silicone release agent).
5. The compositions of Examples 5 and 6 were then cured at 190° C. for hours, followed by 5 hours at 210° C., followed by 5 hours at 250° C. Curing cycles described in the prior art were utilized for comparative Examples 7 through 10.

Using the procedures described above, 180 grams of COMPIMIDE 796 and 80.9 grams of COMPIMIDE TM-121 were mixed and cured. The resulting thermoset resin, referred to hereinafter as the "reference thermoset", had a shear strength of 14006 psi.

The flexural modulus (an indication of stiffness) was also measured and determined to be 596.2K psi).

EXAMPLE 6 (INVENTIVE)

This example illustrates the preparation of a fortifier from a diepoxide and an aromatic polyhydroxyl compound, and the use of the fortifier in a thermoset BMI composition.

The fortifier was prepared by heating 3 gram moles of ECM with 1 gram mole of resorcinol for 1 hour at a temperature between 125° and 130° C. The resorcinol was obtained from the Aldrich Chemical Company and was used as received (i.e. assuming the as received resorcinol to have a molecular weight equal to the theoretical molecular weight of resorcinol, namely 110.1).

45.3 grams of the resorcinol/ECM fortifier was then disolved in 180.9 grams of COMPIMIDE 796, followed by the addition of 80.9 grams of COMPIMIDE TM-121.

Two tests pieces were then cast, cured and subjected to physical testing, according to the procedures described in Example 5.

The fortified thermoset of this inventive example had a shear strength of 14,818 psi (6% higher than than of the reference thermoset of Example 5 and a flexural modulus of 690.1K psi (16% higher than that of the reference thermoset).

EXAMPLE 7 (COMPARATIVE)

This example illustrates a comparative composition which is suggested by U.S. Pat. No. 4,128,598 and the abstract of Japanese Kokai 61/72025 (both of which are assigned to Toshiba).

Both of the above references teach a composition which contains (a) an addition product obtained by reacting a BMI resin with an aminophenol and (b) a selected epoxide having at least two epoxide functional groups.

That is, the adduct of U.S. Pat. No. 4,128,598 is prepared by reacting a BMI with an aminophenol (whereas the adducts, "or fortifiers", of the present invention do not contain a BMI component).

Accordingly, a comparative BMI/aminophenol adduct was prepared by reacting 1 gram mole of COMPIMIDE 796 with 0.2 gram moles of m-aminophenol for 1 hour at 120° C.

The comparative BMI/aminophenol adduct was then mixed with 0.6 gram moles of ECM and cured for 30 minutes at 170° C. and 2 hours at 220° C. (i.e. according to the curing temperatures times described in Example 1 of U.S. Pat. No. 4,128,598).

Four attempts were made to prepare thermosets for the above described composition. However, the composition foamed strongly during the curing cycle, which led to thermosets having many visible flaws (i.e. trapped bubbles). Accordingly, the properties of the comparative thermosets of this example were extremely poor, and no meaningful data could be obtained from flexural modulus or shear strength tests.

EXAMPLE 8 (COMPARATIVE)

This example illustrates thermoset resins which are suggested by the abstract of Japanese Kokai 58/142912 (assigned to Toshiba).

No adduct or intermediate product is taught by Kokai 58/142912.

The components of the composition described in Kokai 48/142912 include (i) a BMI resin, (ii) a diepoxide and (iii) an aminosulfonamide.

Thus, a comparative composition based on these components was prepared by mixing 1 gram mole of COMPIMIDE 796, 0.3 gram moles of ECM and 0.2 gram moles of SAA for 1 hour at 120° C.

The composition was cured according to the procedures described in Example 7.

The resulting thermoset had a flexural modulus of 672.4K psi (i.e. 13% higher than that of the reference thermoset of Example 5, but 18K psi, or 3%, lower than the inventive thermoset of Example 6).

Furthermore, the comparative thermoset of this example was too brittle to provide any meaningful results from the shear strength test. Thus, this comparative thermoset does provide a stiffer thermoset than the reference thermoset of Example 5, but this stiffness is achieved with an associated loss of ductility.

In direct contrast, the fortified composition of the present invention have substantially improved ductility (as measured by shear strength) and, therefore, provide thermosets which are less prone to failure under shear loadings.

EXAMPLE 9 (COMPARATIVE)

This example, illustrates thermoset resins which are suggested by the abstract of Japanese Kokai 58/142913 (assigned to Toshiba).

No adduct, or intermediate product, is taught by Kokai 58/142913.

The components of the composition described in this reference include (i) a BMI resin, (ii) a diepoxide and (iii) o-aminobenzamide.

Accordingly, a comparative composition based on these components was prepared by mixing 1 gram mole of COMPIMIDE 796, 0.3 gram moles of ECM and 0.2 gram moles of o-aminobenzamide for 1 hour at 120° C. This composition was then cured according to the procedures described in Example 7.

The resulting thermoset had a flexural modulus of 696.0K psi (i.e. 15% higher than that of the reference thermoset of Example 5 and 6K psi, or 1%, higher than that of the inventive thermoset of Example 6).

However, the comparative thermosets of this example was too brittle to be subjected to a meaningful shear strength test. Thus, the high stiffness (as measured by flexural modulus) of this comparative thermoset was achieved at the expense of a loss of ductility.

EXAMPLE 10 (COMPARATIVE)

This example illustrates a comparative thermoset which is suggested by U.S. Pat. No. 4,288,359 (assigned to DuPont).

U.S. Pat. No. 4,288,359 teaches a composition which contains (i) the reaction product (or adduct) of a selected diepoxide and a selected BMI, (II) a diamine curative for the reaction product, and (III) a non-amide solvent.

Therefore, the adduct of U.S. Pat. No. 4,288,359 is prepared by reacting a BMI with a diepoxide (whereas the adducts of the present invention are not prepared with a BMI component). In addition, it should be noted that the present invention does not utilize a diamine.

A comparative adduct was prepared by reacting 1 gram mole of COMPIMIDE 796 with 3 gram moles of ECM for 1 hour at a temperature between 125° and 130° C.

44.0 grams of 4-aminophenyl sulfone ("DDS") was then mixed with 227.8 grams of the above comparative adduct.

The mixture was then cured according to the curing cycle descirbed in Example 1 of U.S. Pat. No. 4,288,359 (i.e. 1 hour at 175° C.). The resulting material did not appear to be completely cured and had poor physical properties.

Accordingly, two further mixtures containing 227 gram of the comparative adduct and 44.0 gram of DDS were prepared and cured for 1 hour at 175° C. None of these comparative materials appeared to be completely cured, and all had poor physical properties. No meaningful data could be obtained by subjecting these materials to flexural modulus or shear strength testing.

We claim:

1. A thermosettable resin composition comprising a thermosettable bismaleimide resin and a fortifier, wherein said fortifier is the reaction product of an epoxide and a second reactant, characterized in that
   I) said epoxide is a diepoxide having a first epoxide ring and a second epoxide group with is less reactive than said first epoxide ring, and
   II) said second reactant is aniline, where the molar ratio of said epoxide to aniline is from 1:1 to 10:1, and wherein the amount of said fortifier is from 5 to 30 parts by weight per 100 parts by weight of said bismaleimide resin.

2. A thermosettable resin composition comprising a thermosettable bismaleimide resin and a fortifier, wherein said fortifier is the reaction product of an epoxide and a second reactant, characterized in that
   I) said epoxide is selected from
      I,i) a diepoxide, or
      I,ii) a monoepoxide of the formula

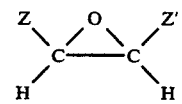

wherein Z and Z' are independently selected from hydrogen, halogen, $C_{1-4}$ alkyl, halogenated $C_{1-4}$ alkyl, phenyl, halogenated phenyl or an alkylene-linked aromatic ether, and
   II) said second reactant is aniline, wherein the molar ratio of said epoxide to aniline is from 1:1 to 10:1, and wherein the amount of said fortifier is from 5 to 30 parts by weight per 100 parts by weight of said bismaleimide resin.

* * * * *